US008862878B2

(12) United States Patent
Bellwood et al.

(10) Patent No.: US 8,862,878 B2
(45) Date of Patent: Oct. 14, 2014

(54) AUTHENTICATION AND AUTHORIZATION OF A DEVICE BY A SERVICE USING BROADCAST ENCRYPTION

(75) Inventors: Thomas A. Bellwood, Austin, TX (US); Jeffrey B. Lotspiech, Henderson, NV (US); Matthew F. Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 12/950,301

(22) Filed: Nov. 19, 2010

(65) Prior Publication Data
US 2012/0131338 A1    May 24, 2012

(51) Int. Cl.
*H04L 9/32* (2006.01)
*H04L 9/08* (2006.01)

(52) U.S. Cl.
CPC ............ *H04L 9/0836* (2013.01); *H04L 9/3271* (2013.01); *H04L 2209/601* (2013.01)
USPC ........................................................ 713/168

(58) Field of Classification Search
None
See application file for complete search history.

(56) References Cited

U.S. PATENT DOCUMENTS

| | | | |
|---|---|---|---|
| 7,213,005 | B2 | 5/2007 | Mourad et al. |
| 7,277,870 | B2 | 10/2007 | Mourad et al. |
| 7,412,063 | B2 | 8/2008 | Jung et al. |
| 7,530,088 | B2 | 5/2009 | Hamilton et al. |
| 7,613,303 | B2 | 11/2009 | Jung et al. |
| 8,201,232 | B2 * | 6/2012 | Zhang et al. ...................... 726/7 |
| 2005/0278257 | A1 * | 12/2005 | Barr et al. ........................ 705/57 |
| 2007/0016769 | A1 * | 1/2007 | Gentry et al. .................. 713/163 |
| 2008/0235810 | A1 * | 9/2008 | Staring et al. ................... 726/29 |
| 2008/0260162 | A1 * | 10/2008 | Jung et al. ...................... 380/278 |
| 2009/0013179 | A1 | 1/2009 | Jung et al. |
| 2009/0016533 | A1 | 1/2009 | Jung et al. |
| 2009/0097648 | A1 * | 4/2009 | Jung et al. ...................... 380/255 |
| 2009/0132682 | A1 * | 5/2009 | Counterman ................. 709/220 |
| 2009/0282257 | A1 * | 11/2009 | Senshu .......................... 713/182 |

(Continued)

OTHER PUBLICATIONS

Jin, H., and Lotspiech, J. 2009. "Broadcast Encryption for Differently Privileged." IFIP International Conference on Information Security (SEC'09), May 18-20, 2009, Cyprus. Published in book entitled "Emerging Challenges for Seucirty, Privacy and Trust." D. Gritzalis and J. Lopez (Eds.): SEC 2009, IFIP AICT 297, pp. 283-293, Jun. 26, 2009.*

(Continued)

*Primary Examiner* — Andrew Nalven
*Assistant Examiner* — Christopher Ruprecht
(74) *Attorney, Agent, or Firm* — John D. Flynn; Gregory K. Goshorn; Greg Goshorn, P.C.

(57) ABSTRACT

Provided are techniques to enable a device that provides a service to authorize a second device for receiving the service and the delivery of the service to the second device and other devices within a trusted network. A signed Management Key Block (MKB) is generated and transmitted over a network. Devices authorized to access a particular service parse the MKB and transmit a request. A server associated with the service determines whether or not the device is authorized to access the service based upon data included in the request. The first device may issue a challenge to the second device for authentication purposes. If service is approved, service is initiated, either from the first device or another authorized device. Devices may be organized into classes such that devices of a specific class are authorized to access the service.

25 Claims, 7 Drawing Sheets

(56) References Cited

U.S. PATENT DOCUMENTS

2010/0040231 A1* 2/2010 Jin et al. ............... 380/255
2010/0067705 A1* 3/2010 Boccon-Gibod et al. ..... 380/285
2010/0199129 A1* 8/2010 Kitani .................. 714/25
2012/0027211 A1* 2/2012 Lehtovirta et al. ........ 380/255

OTHER PUBLICATIONS

Lotspiech, J., "Broadcast Encryption versus Public-Key Cryptography in Content Protection Systems." DRM'09, Nov. 9, 2009, Chicago, Illinois, USA.*

Adelsbach, A., Huber, U. and Sadeghi, A., "Property-Based Broadcast Encryption for Multi-Level Security Policies." D. Won and S. Kim (Eds.): ICISC 2005, LNCS 3935, pp. 15-31, 2006.*

Jin, H. and Lotspiech, J. "Broadcast Encryption for Different Privileged." IFIP International Conference on Information Security (SEC'09), May 18-20, 2009, Cyprus. Published in book entitled "Emerging Challenges for Security, Privacy and Trust." D. Gritzalis and J. Lopez (Eds.): SEC 2009, IFIP AICT 297, pp. 283-293, Jun. 26, 2009.*

De Santis, A. Ferrara, A., Masucci, B.; "Efficient Provably-Secure Hierarchical Key Assignment Schemes"; L. Kucera and A. Kucera (Eds.): MFCS 2007, LNCS 4708, pp. 371-382, 2007. Copyright Springer-Verlag Berlin Heidelberg 2007.*

Deen, G., Ponceleon, D., Leake, D.; "Broadcast Encryption: Paving the Road to Practical Content Protection Systems"; Media Forensics and Security, edited by E. Delp, J. Dittman, N. Memon, P. Wong, Proc. of SPIE-IS&T Electronic Imaging, SPIE vol. 7254, 72540S. Copyright 2009 SPIE-IS&T.*

Pestoni, F. Lotspiech, J., Nusser, S.; "xCP: Peer-to-Peer Content Protection"; IEEE Signal Processing Magazine. Copyright Mar. 2004 IEEE.*

Popescu, B. Crispo, B. Tanenbaum, A.; "Support for Multi-Level Security Policies in DRM Architectures"; NSPW 2004 Nova Scotia Canada. Copyright 2005 ACM.*

Lotspiech, J. Nusser, S., Pestoni, F. "Anonymous Trust: Digital Rights Management Using Broadcast Encryption"; Proceedings of the IEEE, vol. 92, No. 6, Jun. 2004.*

* cited by examiner

AUTHENTICATION AND AUTHORIZATION OF A DEVICE BY A SERVICE USING BROADCAST ENCRYPTION

FIELD OF DISCLOSURE

The claimed subject matter relates generally to providing services over a network and, more specifically, using broadcast encryption for authenticating and authorizing classes and devices to receive a service.

SUMMARY

As computers and media devices have become connected via networks and the Internet, the amount of content and the sophistication of services transmitted among these devices has grown in proportion to the size of the communication channels, or the bandwidth. Once used primarily for electronic mail, or email, and small file transfers, networks such as networks in general and the Internet specifically are increasingly relied upon by providers to distribute services and high quality content such as movies and music recordings.

Service and content providers that distribute services and high quality content face correspondingly increased production, distribution and/or licensing costs. Industries that seek to extend improved networked services to customers must assure that the collection and management of data remains in compliance with security policies and privacy requirements. To control security and restrict access to such services and material, transmitted data is sometimes protected by encryption, digital rights management (DRM) systems or conditional access (CA) systems.

A recent development in the field of encryption of digital data and communication is broadcast encryption. Broadcast encryption is based upon a Management Key Block (MKB), which is a block of cryptographic key data that can be used in conjunction with a set of Device Keys ($K_D$) on a receiving device (e.g. player, renderer etc.) to derive one or more Management Keys ($K_M$). These Management Keys can be used to (directly or indirectly) decrypt one or more content keys, which in turn can be used to decrypt content. Although for the purposes of the following examples, only a single title key is used, the claimed technology is also applicable to systems that employ multiple title keys. For example, some MKB configurations employ title key blocks in which different devices are potentially assigned to different security classes and derive a particular title key that corresponds to the assigned security class.

The term Content Key can be used to mean a simple Title Key ($K_T$), sets of Title Keys (for the same piece of content), Volume Keys, Sector Keys or Disk Keys and can be generalized to any granularity of key used to protect digital data. Large blocks of content may be divided into volumes, sectors or disks, each of which with a separate title key. For example, high definition video content may be divided into sectors that correspond to a progression of title keys that change either on a sector-by-sector basis or periodically during the course of a linear broadcast of the content. The MKB can be delivered concurrent with the content, for example at the beginning of a linear broadcast, or obtained "out-of-band" from a broadcast or internet service, messaged from other devices that are part of the same key space or placed on physical media in the case of prerecorded and recordable content. One of the largest advantages to broadcast encryption is that two or more devices, which might be previously unknown to each other, can agree upon a key over a one-way communication path. This advantage makes broadcast encryption ideal for the communication between two security system components. Another advantage is that broadcast encryption requires two or three orders of magnitude less overhead in the corresponding device than most other systems, thus lowering the cost of the devices for manufacturers and consumers.

Devices that implement the broadcast encryption mechanisms are said to "bind" the data and content they protect to a particular entity (e.g. storage media, a user, an account, a home network or cluster of one or more devices). The entity to which content is logically bound is represented by a domain unique binding identifier ($ID_B$) that is cryptographically combined with one or more management keys ($K_M$) to produce a different key, called the binding key ($K_B$). It should be noted that a $K_M$ used in conjunction with a $ID_B$ can be used as a basis of secure communication between devices in the same network, cluster or authorization table (AT), which is a list of authorized devices in a particular cluster. An example of how a $K_B$ is derived from a simple $K_M$, which is itself derived from a MKB, is explained below. Some current simple approaches to binding a piece of content to a particular entity, regardless of whether it is a piece of media, a device, or a user, is through one level of indirection in the calculation of is encrypted title key ($E_{KT}$) from the entity's binding key ($K_B$). In these cases, the procedure to encrypt a piece of content is roughly the following:

1. Extract a Management Key ($K_M$) by processing the MKB.
2. Perform a one-way function to a piece of data that uniquely identifies the entity this content is being bound to (or the "$ID_B$"), using Km and resulting in a binding key (i.e. $K_B = G(K_M, M_B)$). In the case of cluster or network binding, $ID_B$ represents a unique network identifier.
3. Select a title key ($K_T$), which may be either random or predetermined, for this piece of content and encrypt it using $K_B$, resulting in an encrypted title key ($EK_T$) (i.e. $EK_T = E(K_B, K_1)$).
4. The content is encrypted with the $K_T$ and then the encrypted content is stored in conjunction with the $EK_T$.
5. If the MKB supports multiple security classes, repeat steps 1-4 for each Management Key at the desired security class to create a set of title keys. Implementations may choose to use the same set of title keys to protect a logical volume of content or all or portions of a disk of content.

Once the procedure has been implemented, any compliant device that has access to the same MKB, $ID_B$ and $EK_T$ can decrypt a communication or content by reproducing the same $K_B$ and decrypting $K_T$.

In a further development, the broadcast encryption system has been extended to enable groups, domains or "clusters," of devices to be collected into secure authorized logical networks. In a particular cluster, the list of authorized devices is represented in an entity called an authorization table (AT). If a device's authorization state is changed (e.g. a new device is authorized, a device is suspended or deleted from the cluster), the AT is updated to reflect the change. The Authorization Table, in such a scheme, would be a component of the Binding Key; therefore, when it is updated any data encrypted by the Binding Key (e.g. Title Keys) would in turn need to be re-encrypted. As devices change "clusters" or networks (e.g. from sale or purchases) the $ID_B$ may also change, again causing a need for the binding key to be updated and hence all data or content keys.

An addition development with respect to a broadcast encryption-based content protection scheme is, rather than a single $K_M$, multiple management keys, or management key variants ($K_{MV}$), e.g. $K_{MV}1$, $K_{MV}2$, and so on, are provided. Typically, a single device can only calculate a single $K_{MV}$. Management key variants are employed for forensic purposes in situations in which prepared content has been authored with different equivalent variations. Unlike the typical broadcast encryption-based content protection scheme in which device keys are used to directly derive a $K_M$, a device employs the device keys to derive a $K_{MV}$, which is then employed to derive a "base" $K_M$.

Another development is the introduction of management key precursors. Devices are assigned a security class and derive a management key precursor ($K_M(-i)$ or $K_M^{-i}$) from a $K_{MV}$. Devices of higher security classes are assigned higher "i" values. For example, a device with a security class of '3' would be of a higher security class than a device with a class of '1'. A "base;" or the lowest, security class is a class of '0'. A device in a security class higher than the base class may calculate a $K_M(-i)$ for devices in a lesser security class, if necessary, all the way to the base class by iteratively executing the following one-way function: $K_M^{-(i-1)}=$ AES_G($K_M^{-1}$,kcd), where kcd is a keyspace specific constant. Another development is the implementation of recording keys, which are similar to management key variants, and are employed when content is recorded locally in a particular cluster.

Provide are techniques for, among other things, receiving, at a first device, a management key block (MKB) and a security class, both corresponding to a second device that requests delivery of a service, wherein the security class of the second device is an equal or lower security class than a security class corresponding to the first device; authenticating the MKB with respect to the second device; verifying that the second device is authorized for delivery of the service; and enabling delivery of the service to the second device dependent upon the authenticating and the verifying.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
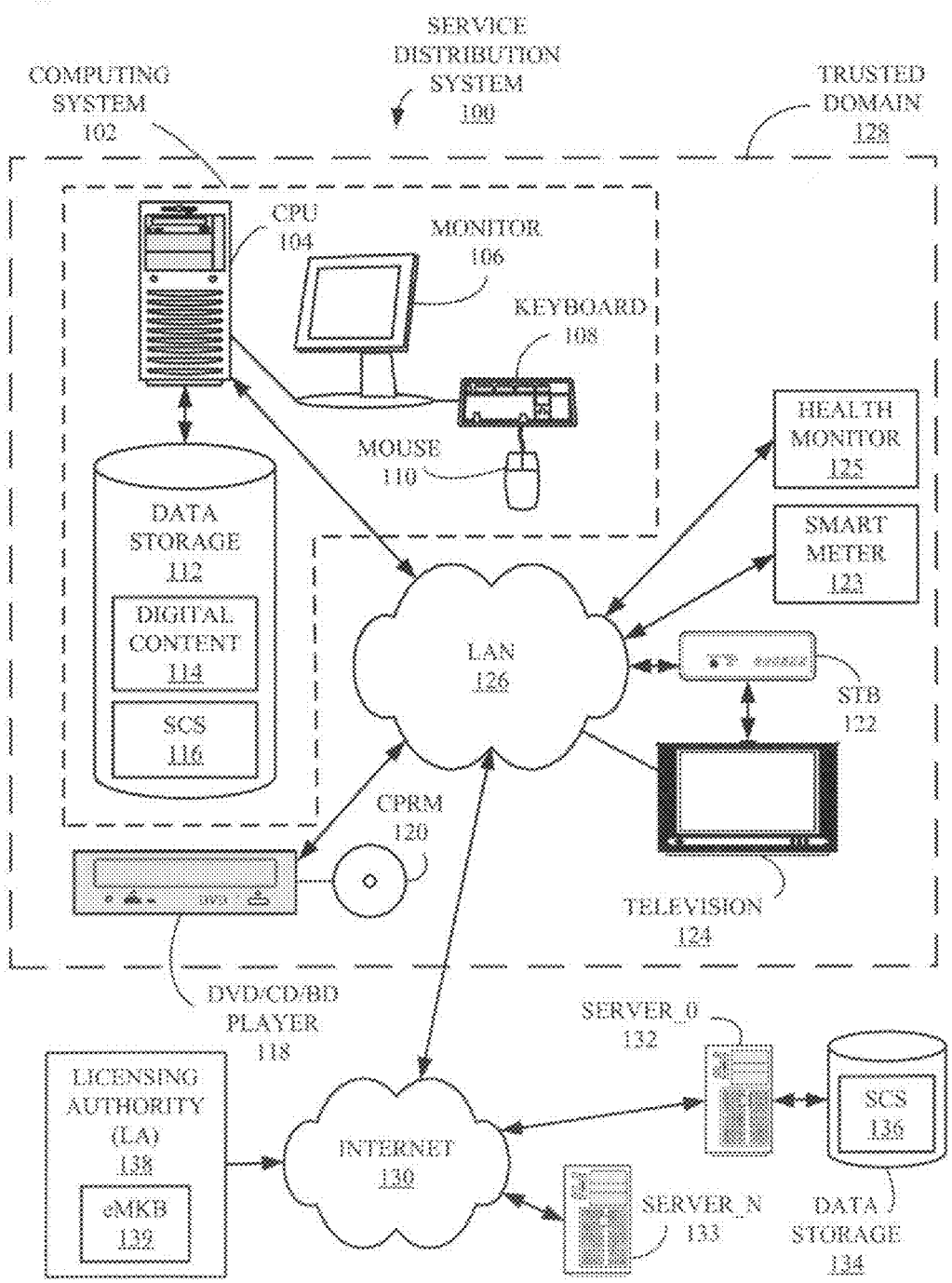
FIG. 1 is a block diagram of one example of a service distribution system that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for controlling delivery of a service in a secure manner using broadcast encryption. The term "programmed method", as used herein, is defined to mean one or more process operations that are presently performed; or, alternatively, one or more process operations that are enabled to be performed at a future point in time. The term "programmed method" anticipates three alternative forms. First, a programmed method may comprise presently performed process operations. Second, a programmed method may comprise a computer-readable medium embodying computer instructions, which when executed by a computer performs one or more process operations. Finally, a programmed method may comprise a computer system that has been programmed by software, hardware, firmware, or any combination thereof, to perform one or more process operations. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Techniques are provided to enable a cryptographic message exchange between a service and a device such that higher security class devices, such as but not limited to devices that provide services, can authenticate devices and security classes, or levels, of devices of an equal or lower security class. In other words, a service may authenticate and/or authorize a particular device or class of devices to receive the service. Once delivery is authorized, the service may be provided by a different device than the device that authorized the delivery, thus enabling a central service to redirect a request to another trusted service. Such a redirection may be based upon information from the client such as, but not limited to, device type and/or model, account data or the identity of the client. It should be understood that a "device" may be, but is not limited to, a virtual device, an application client and client services. In another embodiment, techniques are provided to enable a cryptographic message exchange between a service and a device such that a higher security class device can authenticate a subset of devices in an equal or lower security class. Although the term "service" is primarily described below in the context of a utility, such as electricity or telecommunication functionality, from a utility service provider, it should be understood that a service may also be, but is not limited to, delivery of information that governs access to physical resources, such as from meters in a energy and utility infrastructure or from cell phones and mobile devices in a telecommunications company or the delivery of media content.

Turning now to the figures, FIG. 1 is a block diagram of one example of a service distribution system, 100 that may implement the claimed subject matter. A computing system 102 includes a central processing unit (CPU) 104, which is coupled to a monitor 106, a keyboard 108 and a mouse 110. Monitor 106, keyboard 108 and mouse 110 facilitate human interaction with computing system 102. Attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing example digital content 114, which is one example of a product delivered by a media content delivery service. It should be noted that although digital content 114 is described as digital data, there is no requirement that content protected by the claimed subject matter be digital in nature. The claimed subject matter is equally applicable to analog content. The delivery of digital content 114 is used merely as an example of a service for the purposes of illustration.

Stored on data storage is a service control system (SCS) 116 that is one example of logic that implements elements of the claimed subject matter. SCS 116 is described in more detail below in conjunction with FIGS. 2-7. It should be noted that SCS 116 is shown installed on client system 102 for the purpose of the following description but could also be installed on any media delivery device, such as, but not limited to, a digital video device/compact disk/BluRay (DVD/CD/BR) player 118, set-top box (STB) 122 and a television 124. SCS 116 may also be stored by network accessible (or attached) storage devices, i.e. stored in a remote Internet account but accessible by the network. SCS 116 may also be comprised of many different storage devices and locations but made to appear as one logical system via file system software (e.g. network file system or grid file system).

Computing system 102 is part of an authorized, or trusted, domain 128 of devices. In general, an authorized or trusted domain is a group of devices that adhere to the standards of the claimed subject matter and are able to freely share digital content or a service that is authorized for use by any one of them and in which the authorization has not been revoked. Trusted domain 128, in this example, may also include DVD/CD/BR player 118, STB 122, television 124 and flash memory (not shown). Devices 102, 118, 122 and 124 are used merely as examples of types of devices that might be included in an authorized or trusted domain such as domain 128. Those with skill in the relevant arts will appreciate that are many types of devices, such as, but not limited to, a digital video recorders (DVR), personal computer (PC), book reader, portable drives, mobile phones, and so on, that would benefit form the ability to freely share digital content that is otherwise protected from devices outside of a trusted domain.

Devices 102, 118, 122 and 124 of trusted domain 128 are communicatively coupled via a local area network (LAN) 126. Of course, there are many options for coupling such devices including direct connections, wireless connections and even over multiple interconnected LANs (not shown), a metro area network (MAN) or a wide area network (WAN). In addition, there could be devices (not shown) coupled to LAN 126 or any of devices 102, 118, 122 or 124 that are not included in trusted domain 128. A disk 120 implementing, in this example, Content Protection for Recordable Media (CPRM) is rendered and may be produced by DVD/CD/BR player 118. CPRM is also applicable to streamed media content. It should be noted that CPRM disk 120 is used merely as an example of one of multiple possible content protection schemes. One other example is the Advanced Access Content System (AACS) developed by a consortium including IBM and other companies. In addition to CPRM, other examples of content protection schemes include Secure Digital (SD) cards (not shown) and Content Protection for Extended Media (CPXM). Disk 120 may include information for implementing the claimed subject matter.

LAN 126 is coupled to the Internet 130, which is communicatively coupled to a server_0 132 and a server_N 133. In the following description, server_0 132 is used as an example of a utility service provider. For example, server_0 132 may be responsible for the authorization, setup, enabling and monitoring of electrical service to and data from smart meter 123. Server_N 133 may be responsible for such services as delivery of digital content or the interchange of data with and monitoring of health monitor 125. In other words, a service authorized in accordance with the disclosed techniques may be authorized to both send and receive data from a device such as a client/home network. In addition, a server can verify a client's AT and device keys using the most current eMKB, thus ensuring against the receipt of bogus data.

Both servers 132 and 133 may employ the claimed techniques to deliver a service or content to a device after ensuring that the device is authorized to receive the service or content. Although not shown, servers 132 and 133 typically include a CPU, or processor, keyboard, mouse and monitor to enable human interaction. Although in this example, computing system 102 and servers 132 and 133 are communicatively coupled via LAN 126 and the Internet 130, they may be coupled through any number of communication mediums such as, but not limited to, a direct wire or wireless connection. Further, servers 132 and 133 could be linked directly to LAN 126 and could be either included in trusted domain 128 or not. In this example, servers 132 and 133 are not part of trusted domain 128. Server 132 is coupled to a data storage device 134, which, like data storage 112, may either be incorporated into server 132 i.e. an internal device, or attached externally to server 132 by means of various, commonly available connection devices such as but not limited to, a universal serial bus (USB) port (not shown). Data storage device 134 is illustrated storing a SCS 136, which is described in more detail below in conjunction with FIGS. 2-8. Typically, server_N 133 would also include data storage, which for the sake of simplicity is not shown.

Also coupled to Internet 130 is a licensing authority (LA) 138, which as explained in detail below, generates enhanced management key blocks (eMKB), one of which, an eMKB 139, is illustrated. Like a typical MKB, eMKB 139 is associated with content such as digital content 114 and may be delivered to a client in conjunction with associated encrypted content. For example, if digital content 114 was originally delivered on CPMR 120, eMKB 139 would typically also be delivered via CPMR 120. LA 138, SCSs 116 and 136 and MKBs such as eMLK 139 are employed to implement aspects of the claimed subject matter and are described in more detail below in conjunction with FIGS. 2-8.

Figure 2:
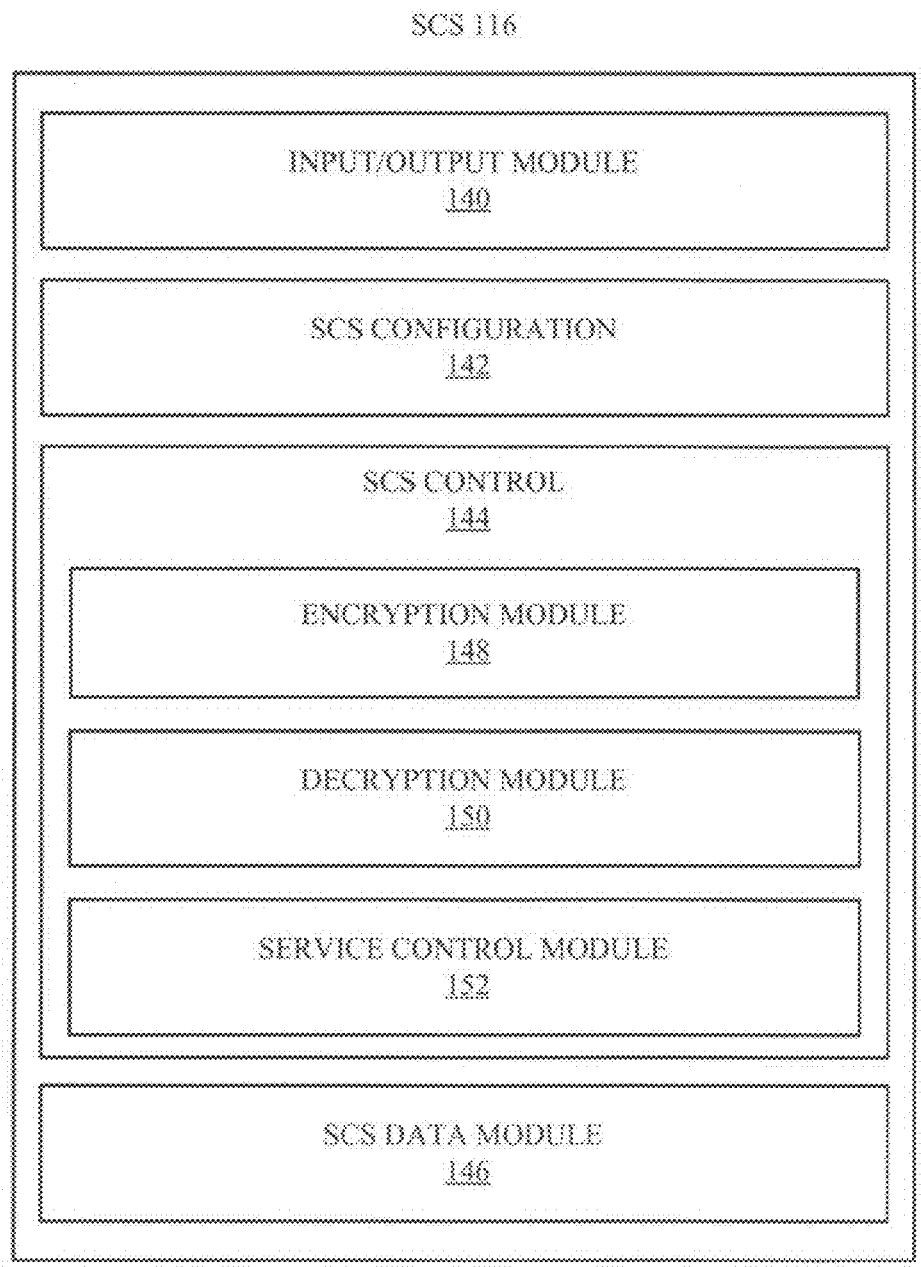
FIG. 2 is a block diagram of a service control system (SCS), first introduced in FIG. 1, in more detail.

FIG. 2 is a block diagram of a SCS such as SCSs 116 and 138, first introduced in conjunction with FIG. 1, in more detail. For the sake of convenience, a SCS is described with respect to SCS 116. In this example, SCS 116 is stored on data storage 112 (FIG. 1) and executed on CPU, or processor, 104 (FIG. 1) of computing system 102 (FIG. 1). A similar device, i.e. SCS 138, is illustrated on server 132 (FIG. 1). Of course, SCS 116 could also be stored and executed on another computing system (not shown) or any media or content delivery device such as, but not limited to, DVD/CD/BR player 118 (FIG. 1), STB 122 (FIG. 1) and server_N 133 (FIG. 1). In fact, the disclosed techniques may be implemented on any device that is configured to control access to content. SCS 116 includes an input/output (I/O) module 140, a SCS Configuration module 142, a SCS Control module 144 and a SCS data cache component 146. It should be understood that the representation of SCS 116 in FIG. 2 is a logical model. In other words, components 140, 142, 144, 146 and other components described below may be stored in the same or separate files and loaded and/or executed within system 100 either as a single system or as separate processes interacting via any available inter process communication (IPC) techniques.

I/O module 140 handles communication SCS 116 has with other components of computing system 102 and system 100. SCS configuration module 142 stores parameters defined by an administrator to control the setup and operation of SCS 116. Examples of such configuration parameters include, but are not limited to, security settings, display options and so on. In addition, parameters may be defined that list potential users, applications and computing hosts and corresponding levels of security and specific implementations of the claimed technology.

SCS control module 144 includes logic to control the operation of SCS 116 in conformity with parameters stored in SCS configuration 142. SCS control module includes an encryption module 148, a decryption module 150 and a content control module (CCM) 152, all of which are explained in more detail below in conjunction with FIGS. 5-7. SCS data module 146 is a data repository or "cache" for information, including settings and other information that SCS 116 requires during operation. Examples of the types of information stored in SCS data cache component 146 include, but are not limited to, specific commands employed in conjunction with modules 148 and 150. In addition, SCS data cache component 146 may store intermediate results associated with the processing of SCS 116. Processing associated with elements 116, 140, 142, 144, 146, 148, 150 and 152 are described in more detail below in conjunction with FIGS. 5-7.

Figure 3:
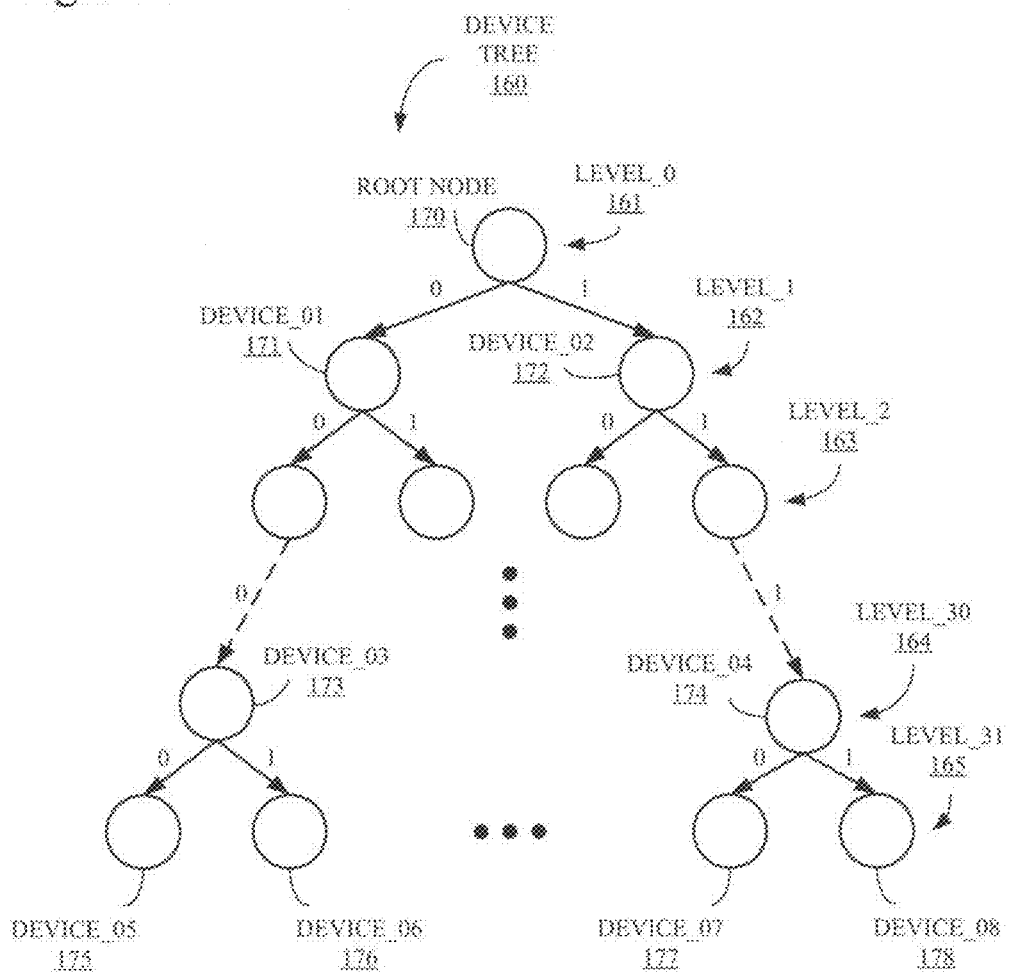
FIG. 3 is a block diagram of a hierarchical device tree employed in one embodiment of the claimed subject matter.

FIG. 3 is a block diagram of an example of a hierarchical structure that may implement the claimed subject matter, specifically a binary device tree 160 employed in one embodiment of the claimed subject matter and employed as an example throughout the present description to explain aspects of the claimed subject matter. It should be understood that the claimed subject matter is also applicable to other types of hierarchical structures such as, but not limited to, a tree that splits into a number "N" branches at each level. In this example, device tree 160 is organized into thirty-two (32) levels, i.e. a level_0 161, a level_1 162, a level_2 163 and so on up to a level_30 164 and a level_31 165. It should be understood that the specific number of levels may vary in different embodiments. In the following example, thirty-two (32) levels are described because that is the convention established for AACS/BluRay. To encompass all devices in the world for broadcast cable, for example, a tree depth of sixty-four (64) levels may be required. For the sake of simplicity, intervening levels are not illustrated. Level_0 161 has one (1) device, or node, i.e. a root node 170, and each level 161-166 has the potential of twice as many devices, or nodes, as the immediately preceding level. For example, level_0 161 represents one (1 or $2^0$) device, level_1 162 has two (2 or $2^1$) nodes, level_2 163 has four (4 or $2^2$) and so on up to level_30 164, which potentially has $2^{30}$ listed devices, and level_31 165, which potentially has $2^{31}$ listed devices. At each level devices, or nodes, are represented as circles but, for the sake of simplicity, each device is not necessarily labeled.

Two examples of devices at level_1 162, i.e. a device_01 171 and a device_02 172, and two examples of devices at level_30 164, i.e. a device_03 173 and a device_04 174, are labeled. Several examples of devices at level_31 165 are labeled, i.e. a device_05 175, a device_06 176, a device_07 177 and a device_08 178. Each device in tree 160, such as devices 171-178, whether labeled or not has a unique device number that represents a pre-order traversal of device tree 160. Each connection between nodes at the adjacent levels is labeled either '0' for a left traversal of tree 160 or '1' for a right traversal. In this manner, device_05 175 has a device number of "0000 0000 0000 0000 0000 0000 0000 0000 0000," device_06 176 has a device number of "0000 0000 0000 0000 0000 0000 0000 0000 0001," device_07 177 has a device number of "1111 1111 1111 1111 1111 1111 1111 1111 1110" and device_08 178 has a device number of "1111 1111 1111 1111 1111 1111 1111 1111 1111." Device tree 160, levels 161-165, root node 170, devices 171-178 and devices numbers are used as examples during the reminder of the present description to explain the claimed subject matter.

Figure 4:
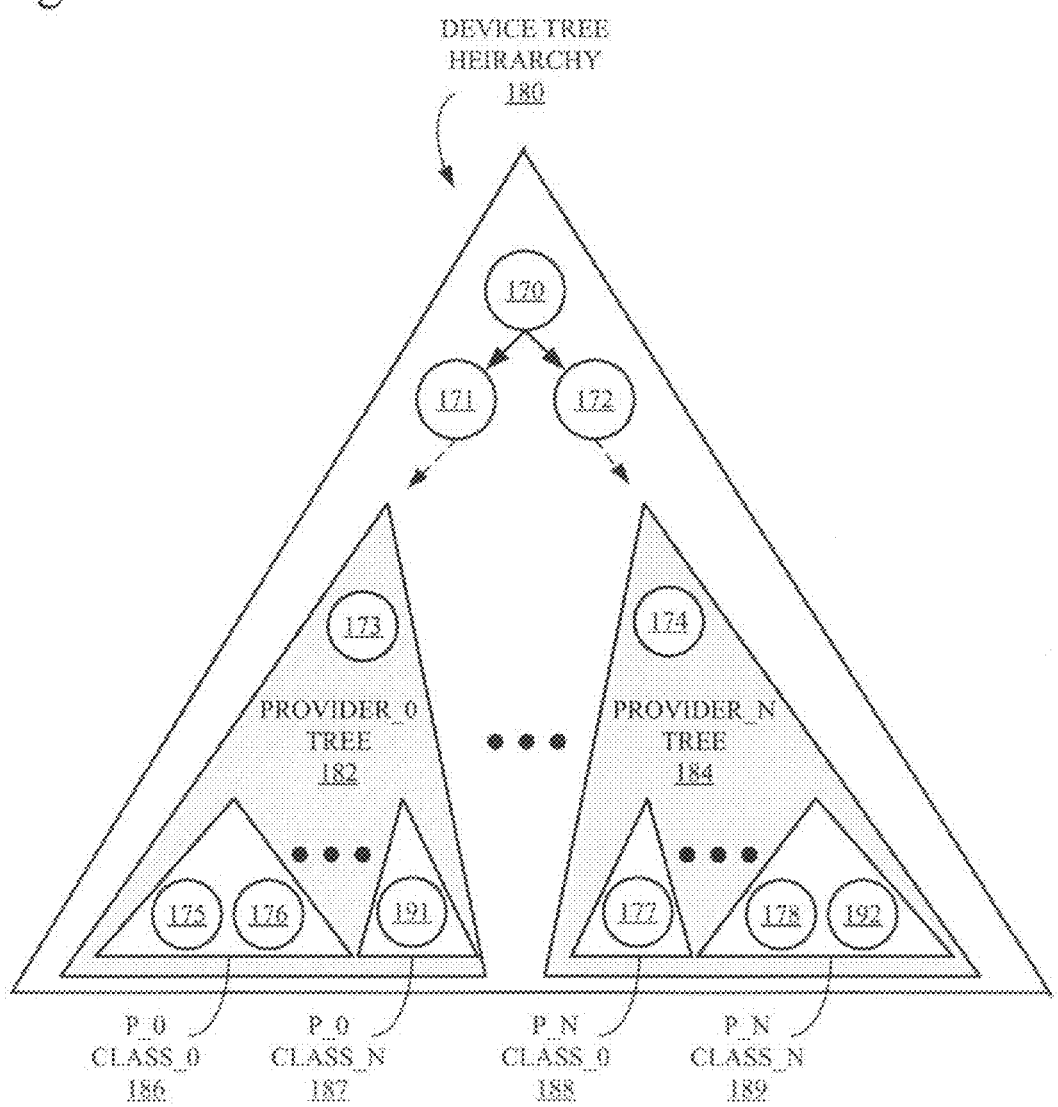
FIG. 4 is a block diagram of a hierarchical structure associated with the device tree of FIG. 3.

FIG. 4 is a block diagram of a hierarchical structure 180 associated with device tree 160 of FIG. 3. For the sake of simplicity, only nodes 170-178 from tree 160 are shown. In this example, device tree hierarchy 180 organizes device tree 160 into provider sub trees, or which two, i.e. a provider_0 tree 182 and a provider_N tree 184 are shown. In the following examples, provider trees 182 and 184 are associated with two different service providers, for server_0 132 (FIG. 1) and server_N 133 (FIG. 1) respectively. In this example, provider_0 tree 182 corresponds to a service provided by server_0 132 (FIG. 1), or the monitoring of health monitor 125 (FIG. 1), and is represented by device_01 171 (FIG. 3). Provider_N tree 184 corresponds to a service provided by server_N 133 (FIG. 1), or the authorization and delivery of electrical service to a facility (not shown) associated with smart meter 123 (FIG. 1), and is represented by device_02 172 (FIG. 3). The described services are used for the purposes of example only and the disclosed techniques are also applicable to the providing of many types of services. For example, devices 171 and 172 could represent two different cable companies, or even two different services provided by one cable company, that provide service to subscribers such as STB 122 (FIG. 1) and DVD/CD/BD player 118 (FIG. 1).

Provider_0 tree 182 corresponds to level_1 162 (FIG. 3) and attached nodes or lower levels. Therefore, provider_0 tree 182 includes device_05 175 and device_06 176, which are organized as a provider_0 class_0 (P_0 C_0) 186. Provider_0 tree 182 also includes a P_0 C_N 187 and an associated device 191. Different classes such as classes 186 and 187 may be employed to represent devices with, but not limited to, different permissions, different levels of service and different device manufactures. The disclosed subject matter enables multiple service providers, using a single LA 138 (FIG. 1) and a single eMKB 139 (FIG. 1) to control all associated devices.

Provider_N tree 184 is illustrated as including device_07 177, which is organized into a P_1 C_0 188, and device_08 178 and a device 192, which are organized into a P_N C_N 189. For the sake of convenience only a few devices, sub-trees and distinct providers are illustrated but one with skill in the relevant art will appreciate that the disclosed techniques are scalable to many providers and applicable to many, possibly interrelated organizational structures.

Figure 5:
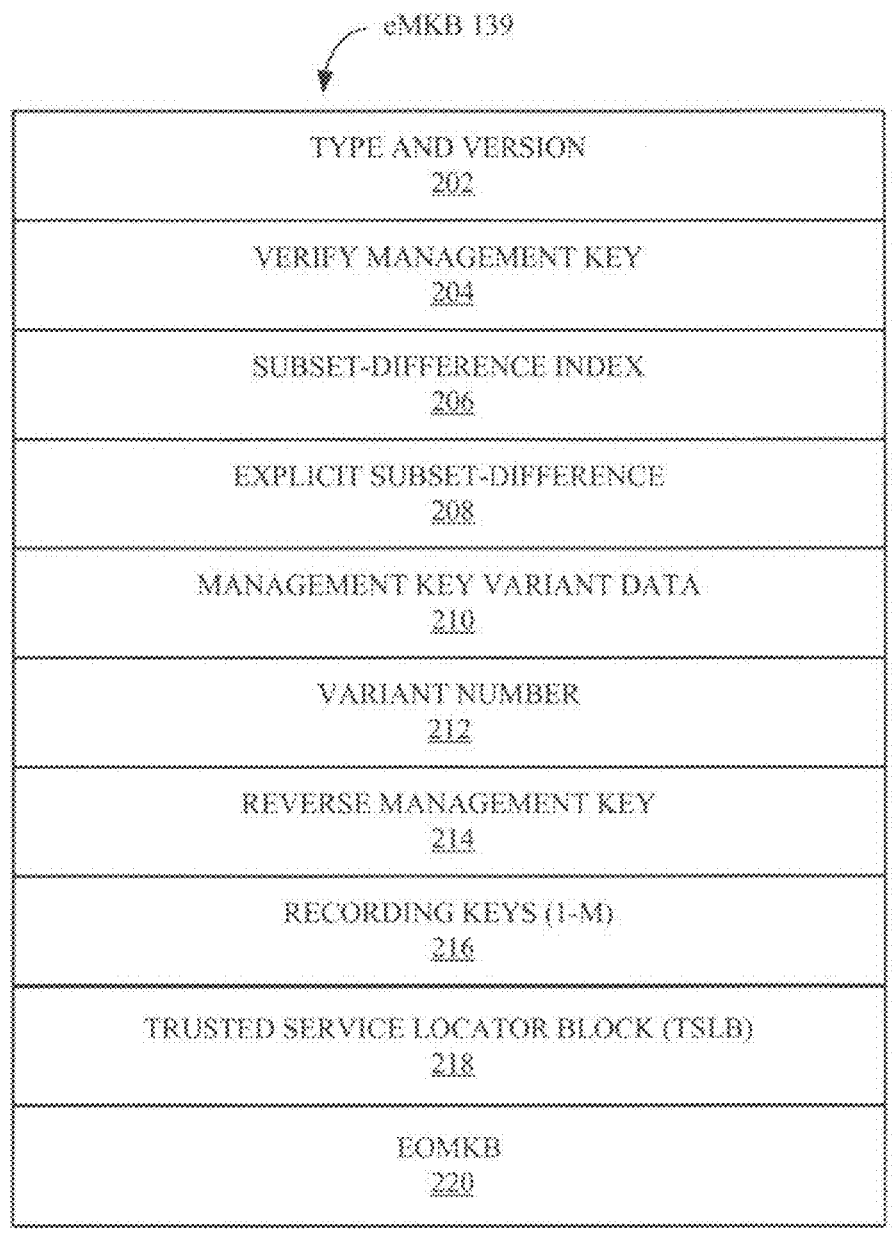
FIG. 5 is a block diagram of an enhanced management key block (eMKB), first introduced in FIG. 1, in more detail.

FIG. 5 is a block diagram of eMKB 139, first introduced in FIG. 1, in more detail. EMKB 139 is an example of a MKB that may implement the claimed subject matter. As explained above in conjunction with FIG. 1, eMKB 139 is generated by LA 138 (FIG. 1) and may be transmitted in conjunction with encrypted content, such as digital content 114 (FIG. 1) to a device, in this example computing system 102 (FIG. 1). In this example, SCS 116 (FIG. 1) employs eMKB 139 to establish delivery of a service to computing system 102.

eMKB 139 includes a type and version block 202, a verify management key block 204, a subset-difference index 206, an explicit subset-difference block 208, a management key variant data block 210, a variant number block 212, a reverse management key block 214, recording keys (1–M) block 216, a trusted service locator block (TSLB) 218 and an end of management key block (EOMKB) 220. Type and version block 202 is employed by a content control system of a device, in this example SCS 116 (FIG. 1) of computing system 102 (FIG. 1), to determine the proper manner to process a corresponding MKB, such as eMKB 139, and whether or not a received MKB is more recent than any MKB currently stored on device 102. A version number, stored in block 202, is a 32-bit unsigned integer. LA 138 (FIG. 1) increments the version number and inserts the updated number into subsequent MKBs each time a change necessitates an update. Examples of such a change include, but are not limited to, an addition to or deletion from authorized or prohibited device lists.

Verify management key 204 is employed by SCS 116 to process eMKB 139 and calculate a management key ($K_M$). Management keys are described in more detail below in conjunction with FIGS. 5-7. Subset-difference index 206 stores an index that enables a particular device to more efficiently lookup the device's corresponding record in explicit subset-difference block 208. Explicit subset-difference block 208 stores a number of records, each record containing a U mask ($m_u$) (not shown) and a UV number (not shown). A V mask ($m_v$) and a path number are derived from the UV number. Like the $m_u$, the $m_v$ is applied against the path number to identify a node in eMKB 139 and the identified node represents a subset of nodes, i.e. the specific node and all the connected nodes below. Together, the $m_u$ and $m_v$ identify a "subset-difference," i.e. a sub-tree of nodes of device tree 160 (FIG. 3) rooted at the node identified by $m_u$ minus the sub-tree of nodes rooted at the node identified by $m_v$. Blocks 206 and 208 and the subset are explained in more detail below in conjunction with FIGS. 5-7.

Management key variant data 210 stores management key variant data for subset-differences identified in explicit subset-difference record 208. Variant number block 212 stores the associated encrypted variant number data for the subset-differences identified in explicit subset-difference record 208. Reverse management key block 214 stores information to enable SCS 116 to decrypt a $K_M$ from a management key variant stored in block 210. In one embodiment of the claimed subject matter, a reverse management key enables SCS 116 to calculate a management key precursor instead of a management key. A management key is then calculated from the management key precursor. Recording keys (1–M) block 216 stores encrypted recording keys. Management key variants, variant numbers, reverse management keys and recording keys are described in more detail below in conjunction with FIGS. 5-7.

TSLB 218 stores one or more records related to authorized, or "trusted," services that a particular device may access. Possible technology associated with TSLB 218 is described in a patent application, that shares an Inventor and is commonly owned (application Ser. No. 12/950,115) and filed concurrently with the present application. Finally, EOMKB 220 indicates the end of eMKB 139.

Figure 6:
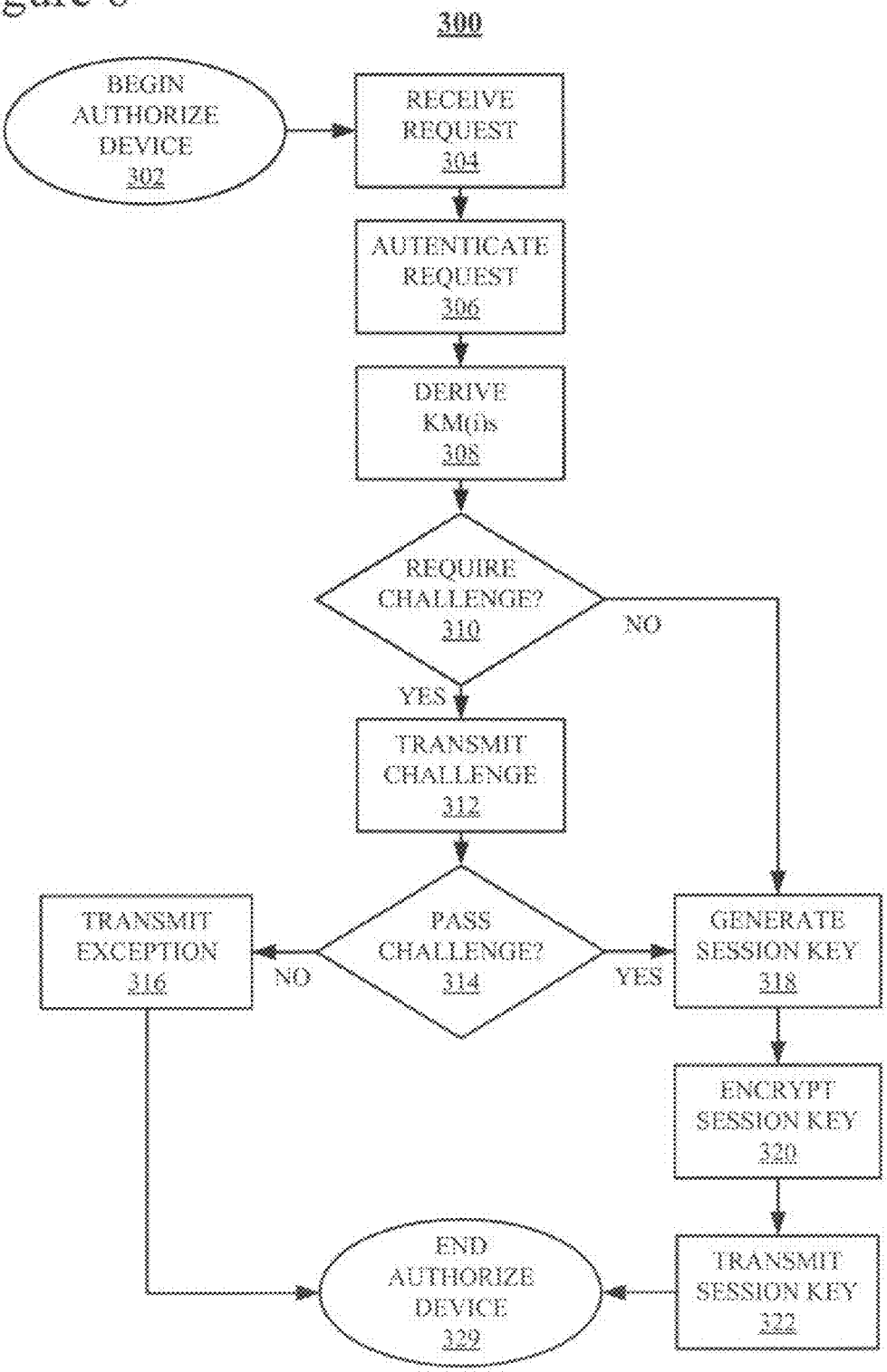
FIG. 6 is a flowchart illustrating one example of an Establish Service process according to the claimed subject matter.

FIG. 6 is a flowchart illustrating one example of an Authorize Device process 300 in accordance with the claimed subject matter. In this example, logic associated with process 300 is stored on data storage 134 (FIG. 1) and executed on CPU, or processor, (not shown) of server_0 132 (FIG. 1). As explained above in conjunction with FIG. 1, server_0 is responsible for providing service to a device, e.g. computing system 102 (FIG. 1) associated with smart meter 123 (FIG. 1). It is assumed that the device receiving the request for service is of a higher security class than the device requesting the service and that a "higher" security class implies such things as greater permissions and fewer restrictions than a "lower" security class. For example, server_0 132 may be associated with node 173 (FIG. 4) of provider_0 tree 182 (FIG. 4) and computing system 102 with node 191 (FIG. 4).

Process 300 starts in a "Begin Authorize Device" block 302 and proceeds immediately to a "Receive Request" block 304. In this example, during block 304, SCS 136 (FIG. 1) of server_0 132 receives a request from SCS 116 (FIG. 1) of computing system 102 to establish electrical service associated with smart meter 123. During an "Authenticate Request" block 306, process 300 ensures the request received during block 304 is a valid request. Typically, authentication is performed by employing a verify management key (see 204, FIG. 5) of an eMKB (see 139, FIGS. 1 and 5) transmitted with the request. Although not shown, if a request cannot be authenticated, process 300 would transmit information concerning the request to an appropriate party and terminate.

During a "Derive $K_M(i)$s" block 308, process 300 derives a $K_M(i)$ associated with the security class of receiving device and a KM(i) associated with the device that transmitted the request. Typically, the security class of the transmitting device is included in the request. One technique for generating $K_M(i)$ of the transmitting device is by employing a one-way hashing function as described above in the Background. During a "Require Challenge?" block 310, process 300 determines whether or not the requesting device 102 needs to be challenged to definitively establish rights to the requested service. If so, process 300 proceeds to a "Transmit Challenge" block 312 during which, in one embodiment, server_0 432, generates a challenge that only the requesting device can answer (see 360, FIG. 7). In one embodiment, a challenge message is generated using Nonce value matching the cipher strength/bit length of the KM(i)s, which is then encrypted with the KM(i) of the requesting device. In the alternative, a session key is encrypted and transmitted to the requesting device rather than a challenge.

During a "Pass Challenge?" block 314, process 300 determines whether or not a response to the challenge (see 360, FIG. 7) is correct. If not, process 300 proceeds to a "Transmit Exception" block 316 during which appropriate action is taken to address a failed challenge. Possible actions include, but are not limited to, logging the failed challenge, notifying an appropriate party and allowing the requesting device to make another attempt. If, during block 314, process 300 determines that the challenge has been passed or, if during block 310, process 300 determines that a challenge is not necessary, control proceeds to a "Generate Session Key" block 318. During block 318, process 300, generates a session key that the requesting device may use to securely communicate with the server_0 132. During an "Encrypt Session Key" block 320, process encrypts the session key using the $K_M(i)$ derived for the requesting device during block 308.

During a "Transmit Session Key" block 322, process 300 transmits session key encrypted during block 320 to the requesting device. At that point, the requesting device may decrypt the encrypted session key and use the key to establish a secure connection to server_0 132 or another device for delivery of the requested service.

It should be understood that, in this example, server_0 132 authorizes delivery of a service but another device may be responsible for providing the service. As explained above, a central service is therefore able to redirect a request to another service trusted by the central service, i.e. a brokered trust, based upon information such as, but not limited to, device type and/or model, account data or the identity of the client. For example, the requesting device may be a cellular telephone that supports a specific format or video. In this case, the service that authorizes the requesting device may enable a service provider that provides video in the specific format to service the request. In another example concerning a health monitor service, the requesting device provides information corresponding to a particular user or account and the authorizing device redirects information from the health monitor to a hospital or doctor designated to receive the information via the authenticated central service.

Finally, once a session key has been transmitted during block 322, or an exception has been handled during block 316, control proceeds to an "End Authorize Service" block 329 in which process 300 is complete.

Figure 7:
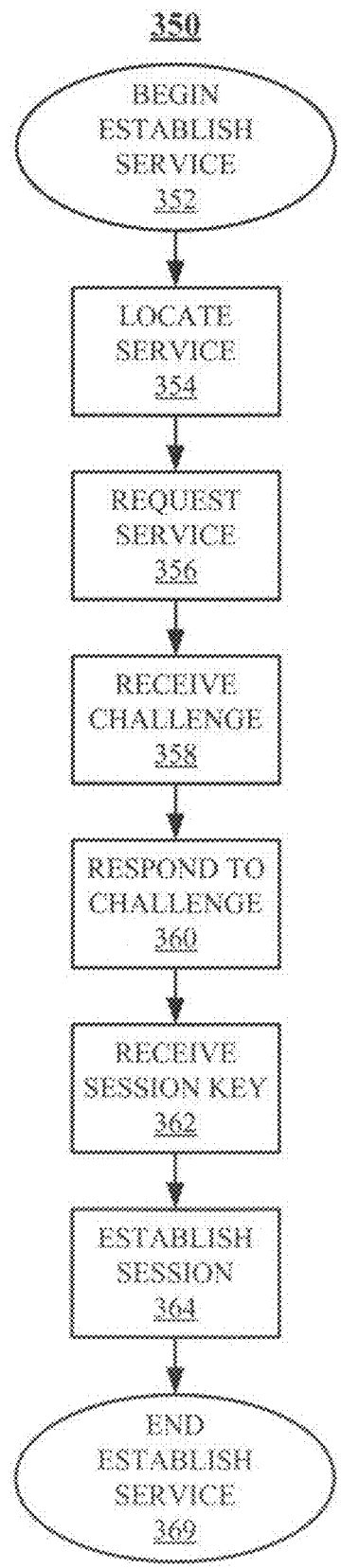
FIG. 7 is a flowchart illustrating one example of an Authorize Device process according to the claimed subject matter.

FIG. 7 is a flowchart illustrating one example of an Establish Service process 350 in accordance with the claimed subject matter. In this example, logic associated with process 350 is stored on data storage 112 (FIG. 1) and executed on CPU, or processor, 104 (FIG. 1) of computing system 102 (FIG. 1).

Process 350 starts in a "Begin Establish Service" block 352 and proceeds immediately to a "Locate Service" block 354. During block 354, process 350 locates a provider for a particular service. Those with skill in the computing arts will appreciate that there are several methods for locating a service including, but not limited to, a search of the Internet or a service registry. In addition, an authenticate service may be located by means of techniques described in a co-owned, co-pending U.S. patent application, entitled "Identifying and Locating Authenticated Services Using Broadcast Encryption", (U.S. Ser. No. 12/950,115) by processing eMKB (see 139, FIGS. 1 and 5). Once a service has been located during block 354, process 350 proceeds to a "Request Service" block 356 during which a server associated with the service is contacted. In this example, the service is associated with server_0 132 (FIG. 1) and smart meter 123 (FIG. 1). Typically, a transmitted request includes an eMKB (see 139, FIGS. 1 and 5) and an indication of a security class, both corresponding to the requesting device. When contacted, server_0 132 responds to the service request with a challenge (see 312, FIG. 6) that is received during a "Receive Challenge" block 358.

During a "Respond to Challenge" block 360, process 300 decrypts the challenge received during block 358 using an independently derived $K_M(i)$ corresponding to the requesting device, which in this example is computing system 102. Once a challenge has been successfully answered, server_0 132 responds with a session key (see 318, 320 and 322, FIG. 6), received during a "Receive Session Key" block 362. Computing system 102 employs the session key received during block 362 to establish secure communication, and thus service, with server_0 132 during an "Establish Session" block 364. Finally, during an "End. Establish Service" block 369, process 350 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in the present description, specify the presence of stated features, integers, steps, operations, elements, and/or components, but do not preclude the presence or addition of one or more other features, integers, steps, operations, elements; components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
   receiving, at a first device, a management key block (MKB) and security class data, both corresponding to a second device that requests delivery of a service, wherein a security class of the second device is an equal or lower security class than a security class correspond in to the first device;
   authenticating the MKB with respect to the second device;
   verifying that the second device is authorized for delivery of the service; and
   enabling delivery of the service to the second device dependent upon the authenticating and the verifying.

2. The method of claim 1, the authenticating comprising:
   generating a challenge to the second device, wherein the challenge may only be correctly responded to by the second device; and
   receiving a correct response to the challenge.

3. The method of claim 1, the enabling comprising transmitting a session key to the second device.

4. The method of claim 3, wherein the session key is transmitted in conjunction with the challenge and the challenge is correctly decrypting the session key.

5. The method of claim 1, wherein the delivery of the service is from a third device that is different than the first device.

6. The method of claim 5, wherein the first device provides an address of the third device to the second device to enable the second device to access the third device.

7. The method of claim 5, wherein the third device is one of a plurality of devices capable of providing the service; and
   wherein the first device selects the third device from the plurality of devices capable of providing the service based upon information transmitted from the second device to the first device.

8. An apparatus, comprising:
   a processor;
   a computer-readable storage medium coupled to the processor; and
   logic, stored on the computer-readable storage medium and executed on the processor, for:
      receiving, at a first device, a management key block (MKB) and security class data, both corresponding to a second device that requests delivery of as service, wherein a security class of the second device is an equal or lower security class than a security class corresponding to the first device;
      authenticating the MKB with respect to the second device;
      verifying that the second device is authorized for delivery of the service; and
      enabling, delivery of the service to the second device dependent upon the authenticating and the verifying.

9. The apparatus of claim 8, the logic for authenticating comprising logic for:
   generating a challenge to the second device, wherein the challenge may only be correctly responded to by the second device; and
   receiving a correct response to the challenge.

10. The apparatus of claim 8, the logic for enabling comprising logic for transmitting a session key to the second device.

11. The apparatus of claim 10, wherein the session key is transmitted in conjunction with the challenge and the challenge is correctly decrypting the session key.

12. The apparatus of claim 8, wherein the delivery of the service is from a third device that is different than the first device.

13. The apparatus of claim 12, wherein the first device provides an address of the third device to the second device to enable the second device to access the third device.

14. The apparatus of claim 12, wherein the third device is one of a plurality of devices capable of providing the service; and wherein the first device selects the third device from the plurality of devices capable of providing the service based upon information transmitted from the second device to the first device.

15. A computer programming product, comprising;
a non-transitory computer-readable storage medium; and
logic, stored on the computer-readable storage medium for execution on a processor, for:
receiving, at a first device, a management key block (MKB) and security class data, both corresponding to a second device that requests delivery of a service, wherein the security class of the second device is an equal or lower security class than a security class corresponding to the first device;
authenticating the MKB with respect to the second device;
verifying that the second device is authorized for delivery of the service; and
enabling delivery of the service to the second device dependent upon the authenticating and the verifying.

16. The computer programming product of claim 15, the logic for authenticating comprising logic for:
generating a challenge to the second device, wherein the challenge may only be correctly responded to by the second device; and
receiving a correct response to the challenge.

17. The computer programming product of claim 15, the logic for enabling comprising logic for transmitting a session key to the second device.

18. The computer programming product of claim 7, wherein the session key is transmitted in conjunction with the challenge and the challenge is correctly decrypting the session key.

19. The computer programming product of claim 15, wherein the delivery of the service is from a third device that is different than the first device.

20. The computer programming product of claim 19, wherein the first device provides an address of the third device to the second device to enable the second device to access the third device.

21. The computer programming product of claim 19, wherein the third device is one of a plurality of devices capable of providing the service; and
wherein the first device selects the third device from the plurality of devices capable of providing the service based upon information transmitted from the second device to the first device.

22. A method, comprising:
transmitting, from a second device to a first device, a management key block (MKB) and a security class, both corresponding to a request for delivery of a service, wherein the security class of the second device is an equal or lower security class than a security class corresponding to the first device;
receiving, the service at the second device upon authentication of the MKB and verification that the second device is authorized for delivery of the service, wherein the authentication and verification are based upon the security class of the first device.

23. The method of claim 22, the authenticating comprising:
receiving by the second device a challenge from the first device, wherein the challenge may only be correctly responded to h the second device; and
transmitting from the second device to the first device a correct response to the challenge.

24. The method of claim 22, wherein the receiving of the service is dependent upon a session key transmitted to the second device form the first device.

25. The method of claim 24, wherein the session key is transmitted in conjunction with the challenge and the challenge is correctly decrypting the session key.

* * * * *